June 7, 1927.

R. M. HILL 1,631,529

ILLUMINATING DEVICE FOR PROJECTION PURPOSES

Filed March 1, 1923      3 Sheets-Sheet 1

Inventor
Roger M. Hill,
By
Attorney

June 7, 1927.
R. M. HILL
1,631,529
ILLUMINATING DEVICE FOR PROJECTION PURPOSES
Filed March 1, 1923    3 Sheets-Sheet 2
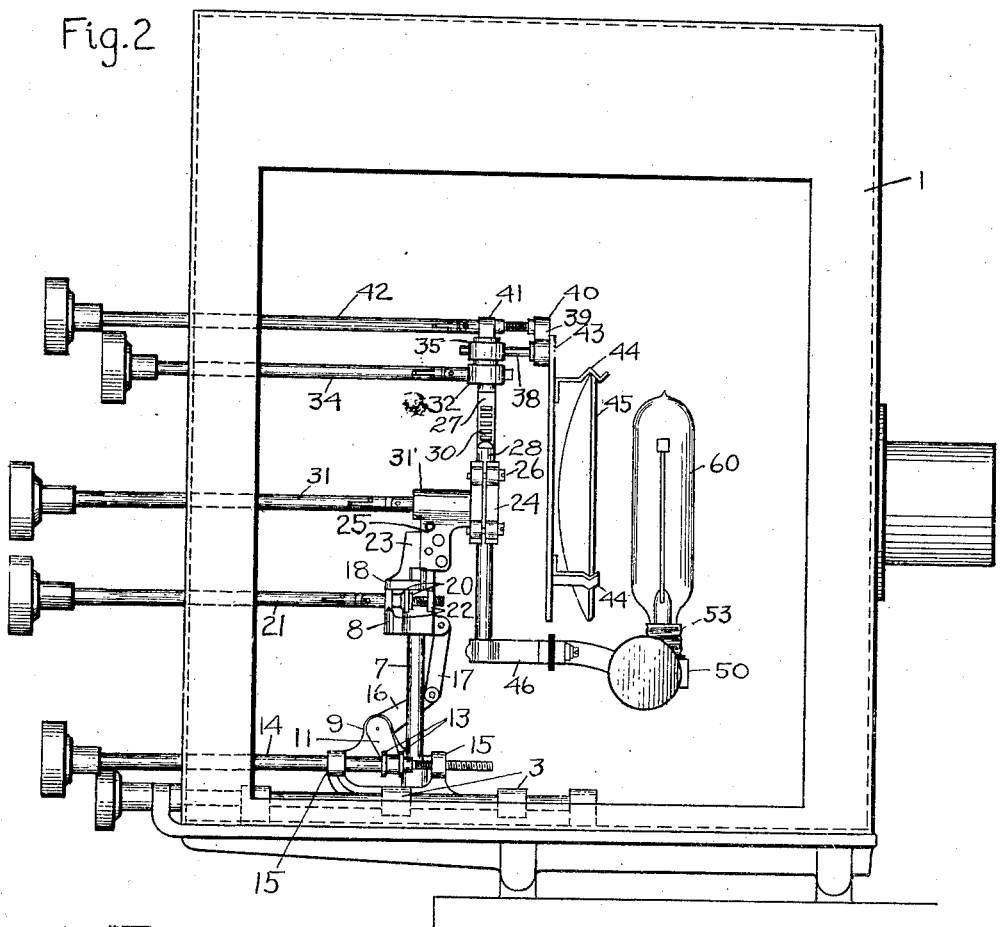
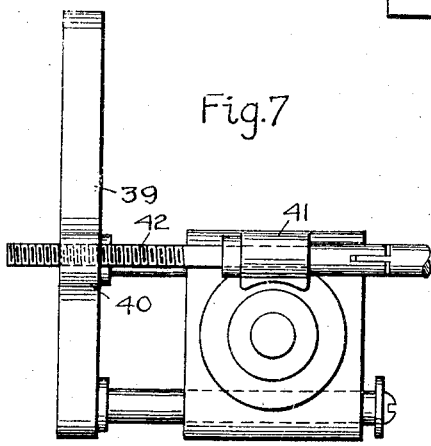
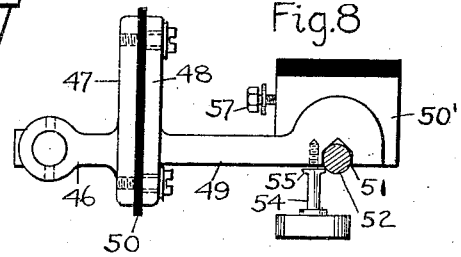
Inventor
Roger M. Hill.
By
Attorney June 7, 1927.
R. M. HILL
1,631,529
ILLUMINATING DEVICE FOR PROJECTION PURPOSES
Filed March 1, 1923   3 Sheets-Sheet 3
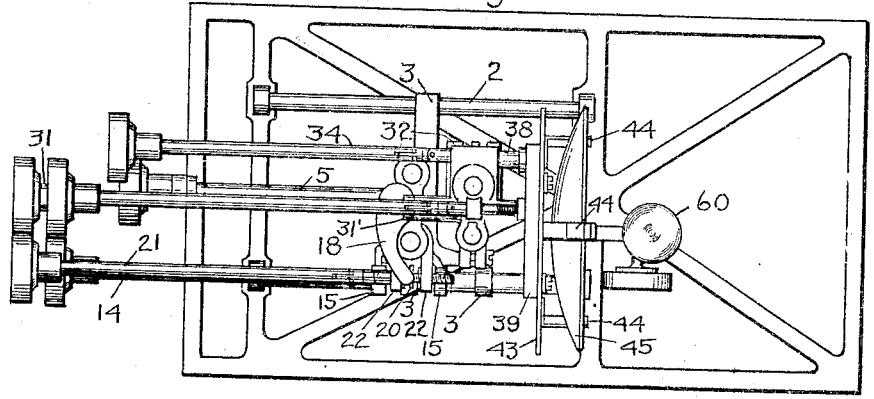
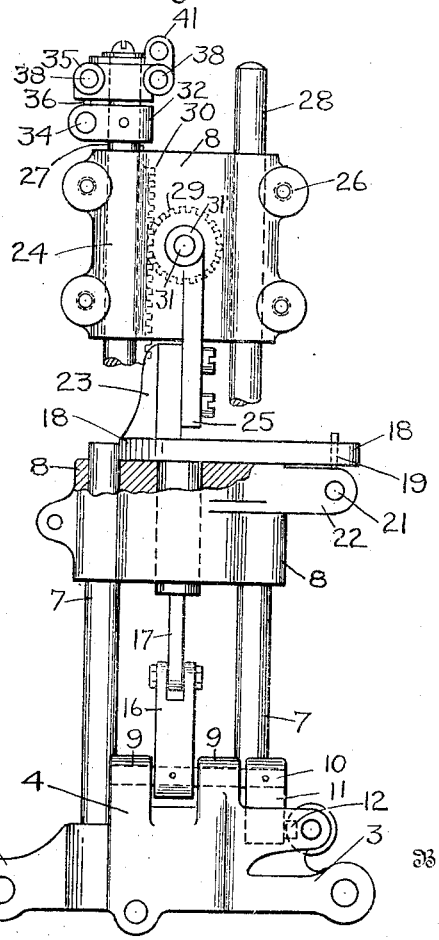
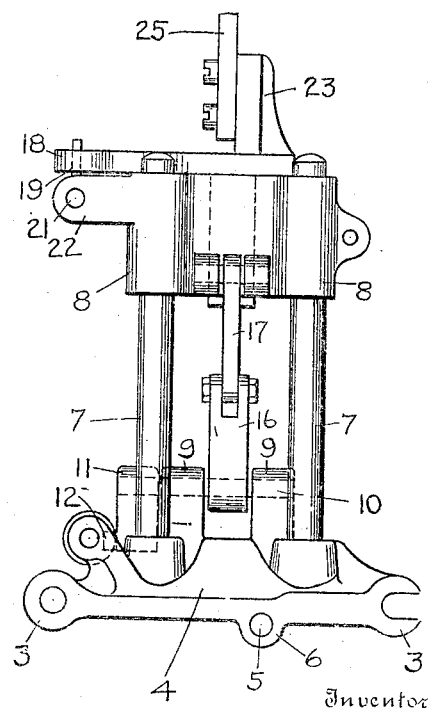
Inventor
Roger M. Hill.
By
Attorney Patented June 7, 1927.

1,631,529

UNITED STATES PATENT OFFICE.

ROGER M. HILL, OF WASHINGTON, DISTRICT OF COLUMBIA.

ILLUMINATING DEVICE FOR PROJECTION PURPOSES.

Application filed March 1, 1923. Serial No. 622,219.

This invention generically relates to projection apparatus more especially it is directed to a mechanism for effecting adjustment of the light source and its reflector.

One of the objects of this invention is to provide a projecting apparatus embodying an adjustment affording independent movement of reflector and light source.

Another object of this invention is to provide a projector utilizing an incandescent lamp as a light source, the lamp and its reflector being susceptible of several movements; all of which are controlled from a point exterior of the projector housing.

Another object of this invention is to provide an apparatus which will enable, with comparatively few mechanical alterations, the substitution of an adjustable incandescent lamp and reflector for the electrodes, employed with projectors, using an electric arc as a source of illumination.

Other objects of this invention are to facilitate accurate adjustment of either lamp or reflector; and to produce an apparatus of the character indicated embodying but few parts so assembled as to materially simplify projection.

With these and other objects in view this invention consists in certain novel details of construction, combination and arrangement of parts to be more particularly hereinafter set forth and claimed.

Briefly stated, this invention comprises a rectilinearly movable carriage, an incandescent lamp and reflector carried thereby and means to actuate either lamp or reflector horizontally, vertically or arcuately as may be required to accurately focus the light source with respect to the condensers of the optical system of the projector.

Referring more particularly to the accompanying drawings in which corresponding parts are indicated by similar reference characters:

Fig. 2 is a side elevation of the projector the door of the housing being omitted.

Fig. 3 is a top plan of the adjusting mechanism for the lamp and reflector, and its supporting frame.

Fig. 4 is a sectionized rear elevation of carriage, upper and lower turrets and their accessories.

Fig. 5 is a sectionized front elevation of carriage and lower turret and means for effecting turret adjustment.

Fig. 7 is a top plan of the upper turret and reflector support and,

Fig. 8 is a top plan of the lamp, adapter and its supporting bracket.

Figure 1:
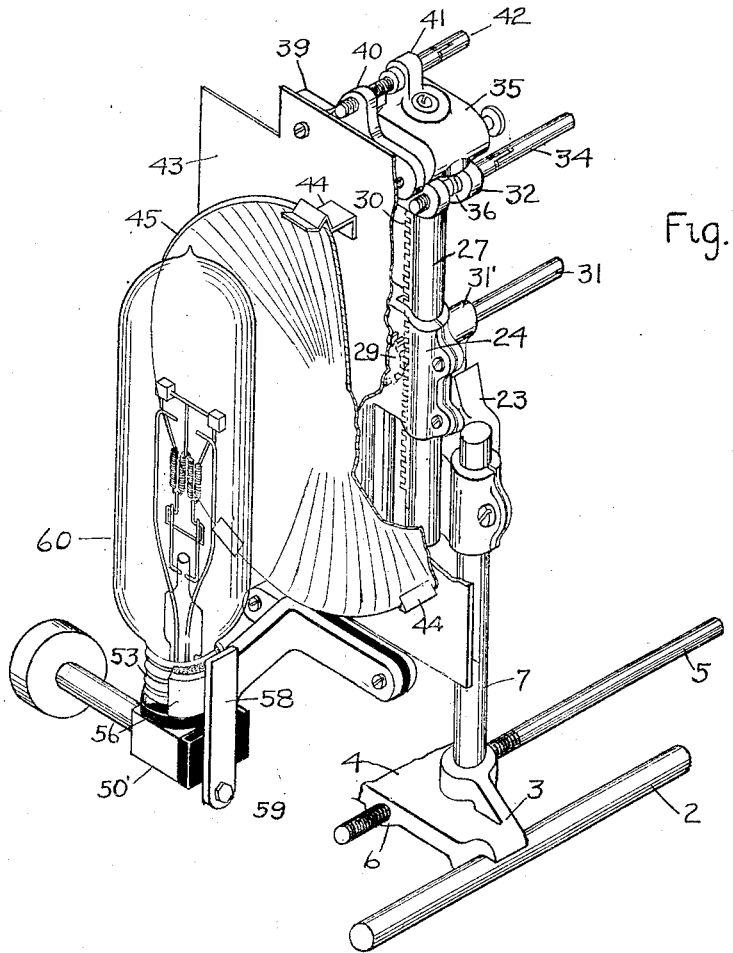
Fig. 1 is a fragmentary perspective view.

Familiar types of projecting apparatus usually employ an electric arc as a source of illumination since it furnishes a concentrated source of light and gives a substantially uniform illumination over the area on which it is projected. The many improvements which have been made in the incandescent lamp have rendered it suitable for projection apparatus so that these lamps are now being largely substituted for their predecessor the electric arc, owing to their convenience in operation and adjustment.

It is therefore the aim and purpose of this invention to provide a simple, inexpensive and convenient means by which the electric arc mechanism may be salvaged and transformed into a projector using an outfit including lamp and reflector, both of which are adjustable to any desired position.

In the illustrated embodiment characterizing this invention (1) indicates a projector housing of conventional form and construction; (2) parallel tracks spaced and adapted to be slidably engaged by the extremities (3) of carriage (4). (5) indicates a control rod the inner end of which is in threaded engagement with ear (6), depending from carriage (4), whereby, upon rotation of the control rod (5) the carriage is longitudinally moved to and from the forward portion of the projector housing.

(7) indicates a pair of vertical standards arising in parallel relation from the carriage and on which is slidably mounted a turret base (8). (9) represents a pair of laterally spaced ears integral with the carriage and formed with alining openings to journal the ends of shaft (10), to which is keyed an arm (11) having at its lower extremity a laterally projecting stud (12)

which extends between collars (13) keyed to the inner end of control rod (14) which is journalled between ears (15) laterally extending from the carriage as clearly shown in Figure 4 of the drawings.

(16) indicates a crank keyed to shaft (10) and connected by link (17) to the turret base (8). With this construction it is apparent as control rod (14) is rotated, turret base (8) will be raised or lowered on guides (7), through the medium of the connection just described.

(18) indicates a finger shaped turret swivelly mounted on base (8). (19) a lug depending from the outer extremity of the turret and projecting between collars (20) keyed to control shaft (21), the inner end of which passes through the threaded openings in ears (22) extending in parallel relation from the side of the turret base as clearly shown in Figures 2 and 4. As the control rod (21) is rotated longitudinal movement is imparted thereto and by virtue of its connection with the turret the latter is swivelled on its mounting.

(23) indicates a bracket surmounting the turret and supporting block (24) through the medium of connecting plate (25). Block (24) is in the form of complemental plates bolted as at (26) and interiorly formed so as to embrace guides (27) and (28) the former being mounted for vertical movement in block (24), the latter being held stationary for a purpose as will be hereinafter explained.

(29) indicates a pinion centrally journalled within block (24) and meshing with rack (30) affixed to the inner side of rod (27). Pinion (29) is keyed to the inner end of control rod (31) which passes through sleeve (31') of the block to the exterior of the housing.

When control rod (31) is rotated shaft (27) is caused to move upwardly or downwardly in block (24) as clearly shown in Figure 4 of the drawing. (32) represents a U-shaped clamp which securely embraces the shaft (27) at a point spaced from its upper end. The extremities of clamp (32) are formed with internally threaded bores to journal the inner end of control rod (34).

Figure 6:
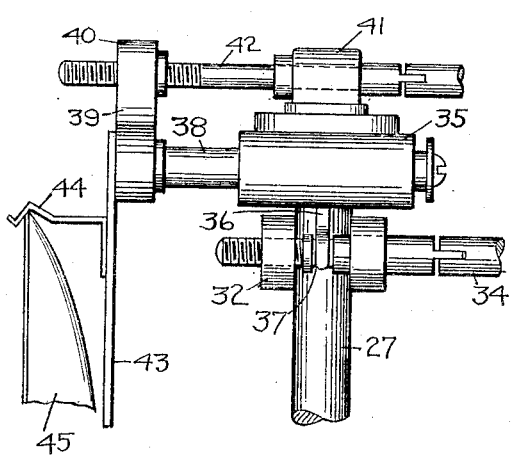
Fig. 6 is a fragmentary sectionized side elevation of the upper turret assembly.

(35) represents an upper turret swivelly mounted on the reduced upper end of shaft (27). (36) indicates a lug depending from the turret and seating in groove (37) formed in control rod (34), intermediate the extremities of the clamp. Manifestly, as control rod (34) is rotated, turret (35) is swivelled on its mounting as shown in Figure 6.

(38) represents parallel guides horizontally slidable in the upper turret (35). (39) indicates an anchoring plate which is affixed to the outer extremities of guides (38). Plate (39) is formed with an ear (40) having an internally threaded opening alining with a similarly formed opening in ear (41) arising from the upper surface of turret (35). (42) represents a control rod which is threaded at its inner end and passes through ear (41) and into threaded opening of ear (40) of the attaching plate (39), so that as the control rod (42) is rotated, plate (39) will be longitudinally actuated.

(43) indicates a reflector supporting plate from the outer surface of which there projects at equally distant points resilient grips (44). (45) indicates a suitable reflector adapted to be engaged at its periphery by the grips (44) through the instrumentality of which it is supported in off-set relation with respect to the support (43).

(46) indicates a horizontally disposed bracket connected at its inner end to the lower extremity of rod (28) which it will be recalled is securely fastened in block (24) previously referred to. See Figure 2 of drawings.

Bracket (46) terminates in a head (47) to which is affixed the head (48) of adapter arm (49). (50) represents insulating material, interposed between heads (47) and (48) as clearly shown in Figure 8 of the drawings.

The outer extremity of adapter arm (49) is formed with a rectangular enlargement (50) having therein pentagonal slot (51) to receive the cylindrical shaped shank (52) of the internally threaded adapter socket (53). (54) indicates a set screw the stem of which is formed with an annular flange (55) which, when the set screw is adjusted engages the edge of the shank (52) to retain the latter in a fixed position as clearly shown in Figure 8 of the drawings.

(56) indicates an arcuate shaped brush designed to engage the adapter socket (53) for transmitting electrical energy of one polarity thereto, the opposite polarity being transmitted through the shank of the adapter socket to the block (50) from which it is conducted by a suitable terminal as at (57) (see Figure 8) to the source of supply.

(58) indicates a supporting arm for brush (56) which is attached in suitably insulated relation to block (50). The inner end of arm (58) is formed with a terminal (59) to which a conductor may be attached. (60) indicates an incandescent lamp the plug portion of which is adapted to be threaded in socket (53) as clearly shown in Figure 1.

When the lamp is thus positioned current is transmitted via arm (58), brush (56), adapter socket (53) to the filament of the lamp through the latter to shank (52) to block (50) of the adapter from whence it passes to the source of supply.

In regard to the control rods, it is to be understood they are provided with flexible joints, and suitable operating knobs on their free outer ends which project through the housing as shown in Figure 2.

In view of the preceding structural outline it will be seen by manipulation of the proper control rod the lamp and its reflector may be simultaneously actuated, longitudinally, arcuately and vertically, or the reflector may be given these movements independent of the lamp according to the adjustment necessary to place the source of illumination in proper focused relation with respect to the optical system of the apparatus.

In conclusion it is to be noted this invention may be applied to existing arc light structure for projection apparatus by substituting the reflector and adapter bracket for the upper and lower electrode holders respectively and removing one of the racks usually employed to produce reciprocal movement of the electrodes, whereupon a ready conversion is obtained from the electric arc as a source of illumination to the Mazda incandescent lamp with its many conveniences.

Although in the foregoing certain elements have been described as best adapted to perform the functions allotted to them, nevertheless it is to be understood that various minor changes may be resorted to within the scope of the appended claims without departing from or sacrificing any of the principles of this invention.

Having described my invention, what I claim as new and wish to secure by Letters Patent is:

1. In a projection apparatus the combination of a longitudinally and arcuately movable supporting block, guides positioned in said block, one of said guides being fixed the other vertically movable, an adapter bracket secured to the lower end of the fixed guide, a lamp supported by said bracket, a turret swivelled at the upper end of said movable guide, remote control means connected with said turret to swivel the latter, longitudinally adjustable guides carried by said turret and a reflector supported by said guides.

2. In a projection apparatus the combination of a supporting block, guides positioned in the block, one of said guides being fixed the other vertically movable, an adapter bracket secured at the lower end of the fixed guide, a lamp supported by said bracket, a turret swivelled at the upper end of said movable guide, remote control means connected with said turret to swivel the latter and a reflector carried by said turret.

3. In a projection apparatus the combination of a longitudinal adjustable supporting block, guides positioned in said block, one of said guides being fixed the other vertically movable, an adapter bracket, secured to the lower end of the fixed guide, a lamp supported by said bracket, a turret swivelled at the upper end of said movable guide, remote control means connected to said turret to swivel the latter and a reflector supported by said turret.

4. In a projection apparatus the combination of an arcuately movable supporting block, guides positioned in said block, one of said guides being fixed and the other movable, an adapter bracket secured at the lower end of the fixed guide, a lamp supported by said bracket, a turret swivelled at the upper end of said movable guide, remote control means connected with said turret to swivel the latter and a reflector supported by said turret.

5. In a projection apparatus the combination of a longitudinally and arcuately movable supporting block, guides positioned in said block, one of said guides being fixed the other vertically movable, an adapter bracket secured to the lower end of the fixed guide, a lamp supported by the bracket, a turret swivelled at the upper end of said movable guide, remote control means connected with said turret to swivel the latter and a reflector supported by said turret.

6. In a projection apparatus the combination of an adjustable supporting block, guides positioned in said block, one of said guides being fixed and the other movable, an adapter bracket secured at the lower end of the guide, a lamp supported by said bracket, a turret swivelled at the upper end of said movable guide, remote control means connected to said turret to swivel the latter, longitudinally adjustable guides carried by said turret and a reflector supported by said guides.

7. In a projection apparatus the combination of a supporting block, guides positioned in said block, one of said guides being fixed the other movable and an illuminating fixture attached to the fixed guide, a reflector supported by the movable guide, said reflector being movable arcuately about and transversely and parallel to the vertical axis of said movable guide, and means coacting with said reflector to effect its adjustment.

8. In a projection apparatus the combination of an adjustable supporting block, guides positioned in said block, one of said guides being fixed the other vertically movable and an illuminating fixture attached to the fixed guide, a reflector supported by the movable guide, said reflector being adjustable arcuately, transversely and parallel to the vertical axis of said movable guide and means coacting with said reflector to effect its adjustment.

9. In a projection apparatus the combination of an adjustable supporting block, guides vertically positioned in said block, one of said guides being fixed the other vertically movable, an illuminating fixture attached to the fixed guide, a reflector carried by the movable guide, said reflector being adjustable arcuately and transversely to the vertical axis of the movable guide and means coacting with said reflector to effect its adjustment.

10. In a projection apparatus the combination of a supporting block, guides vertically positioned in said block, one of the guides being fixed the other movable, an illuminating fixture attached to the fixed guide, a reflector carried by the movable guide, said reflector being adjustable arcuately and parallel to the vertical axis of the movable guide and means coacting with said reflector to effect its adjustment.

11. In a projection apparatus the combination of a supporting block, guides vertically positioned in the block, one of said guides being fixed the other vertically movable, an illuminating fixture attached to the fixed guide, a reflector carried by the movable guide, said reflector being movable arcuately about the vertical axis of the movable guide, and means coacting with said reflector to effect its adjustment.

12. In a projection apparatus the combination of a longitudinally, vertically and arcuately movable supporting block, guides positioned in said block, one of said guides being fixed the other vertically movable, an illuminating fixture attached to the fixed guide, a reflector carried by the movable guide, said reflector being adjustable arcuately, transversely and parallel to the vertical axis of the movable guide, and means coacting with said reflector to effect its adjustment.

13. In a projection apparatus the combination of a vertical standard, a supporting block mounted on the upper end of said standard, said block being adjustable arcuately about and transversely and parallel to the vertical axis of said standard, guides positioned in said block, one of said guides being fixed the other vertically movable, a reflector carried by said movable guide and an illuminating fixture supported by said fixed guide.

14. In a projection apparatus the combination of a vertical standard, a supporting block mounted on the upper end of the standard, said block being adjustable arcuately about and transversely and parallel to the vertical axis of said standard, guides positioned in said block, one of said guides being fixed the other vertically movable, an illuminating fixture supported by said fixed guide, a reflector affixed to said movable guide, said reflector being arcuately adjustable about the vertical axis of said movable guide.

15. In a projection apparatus the combination of a vertical standard, a supporting block mounted on the upper end of said standard, said block being adjustable arcuately about and transversely and parallel to the vertical axis of said standard, guides positioned in said block, one of said guides being fixed the other movable, an illuminating fixture supported by said movable guide, a reflector affixed to said fixed guide, said reflector being arcuately and transversely adjustable with respect to the vertical axis of said movable guide.

16. In a projection apparatus the combination of a vertical standard, a supporting block mounted on the upper end of said standard, said block being adjustable arcuately about and transversely and parallel to the axis of said vertical guide, guides positioned in said block, one of said guides being fixed, the other vertically movable, an adapter bracket affixed to the lower end of the fixed guide, a lamp supported by said bracket, a turret swivelled at the upper end of said movable guide, remote control means connected with said turret to swivel the latter and a reflector supported by said turret.

17. In a projection apparatus the combination of a vertical standard, a support mounted on the upper end of said standard, said support being arcuately adjustable with respect to the vertical axis of said standard, guides positioned in said block, one of said guides being fixed the other movable, an adapter bracket secured to the lower end of said fixed guide, a lamp supported by said bracket, a turret swivelled at the upper end of said movable guide, remote control means connected with said turret to swivel the latter and a reflector supported by said turret.

18. In a projection apparatus the combination of a vertical standard, a turret positioned on the upper end of the standard, said turret being adjustable transversely and parallel to the vertical axis of said standard, guide rods positioned in said turret, one of said rods being fixed the other movable, an adapter bracket secured to the lower end of the fixed guide, a lamp supported by said bracket, a turret swivelled at the upper end of said movable guide, remote control means connected with said turret to swivel the latter, and a reflector supported by said turret.

19. In a projection apparatus the combination of a vertical standard, a supporting block positioned on the upper end of the standard, said block being adjustable arcuately and parallel to the vertical axis of said standard, guides positioned in said block, one of the guides being fixed the other vertically movable, an adapter bracket secured to the upper end of the fixed guide, a lamp supported by said bracket, a turret swivelled at the upper end of said movable guide, remote control means connected with said turret to swivel the latter and a reflector supported by said turret.

20. In a projection apparatus the combination of a vertical standard, a supporting block mounted on the upper end of the standard, said block being adjustable parallel to the vertical axis of the standard, guide rods positioned in said standard, one of said guides being fixed the other vertically movable, an adapter bracket secured to the upper end of the fixed guide, a lamp supported by said bracket, a turret swivelled at the upper end of said movable guide, remote control means connected with said turret to swivel the latter and a reflector supported by said turret.

21. In a projection apparatus the combination of a vertical standard, a supporting block positioned on the upper end of the standard, said block being arcuately adjustable about the vertical axis of said standard, guides supported in said block, one of said guides being movable the other fixed, an adapter bracket secured to the lower end of the fixed guide, a lamp supported by said bracket, a turret swivelled at the upper end of said movable guide, remote control means connected with said turret to swivel the latter, longitudinal adjustable guides carried by said turret and a reflector supported by said guides.

22. In a projection apparatus the combination of a vertical standard, a supporting block positioned on the upper end of said standard, said block being adjustable arcuately, transversely and parallel to the vertical axis of said standard, guides carried by said supporting block, one of said guides being fixed the other movable, an illuminating fixture secured to the lower end of the fixed guide, a turret mounted on the upper end of the movable guide, said turret being adjustable arcuately, transversely and parallel to the vertical axis of said guide, and a reflector supported by said turret.

23. In a projection apparatus the combination of a vertical standard, a supporting block mounted on the upper end of the standard, said block being adjustable relative to the vertical axis of said standard, guides positioned in said block, one of said guides being fixed the other movable, an illuminating fixture secured to the lower end of the fixed guide, a turret mounted on the upper end of the movable guide, said turret being adjustable arcuately about the axis of the movable guide and a reflector carried by said turret.

24. In a projection apparatus the combination of a vertical standard, a supporting block positioned on the upper end of the standard, said block being adjustable relative to the vertical axis of said standard, guides positioned in said block, one of said guides being fixed the other movable, an illuminating fixture secured to the lower end of the fixed guide, a turret mounted on the upper extremity of the movable guide, said turret being arcuately and transversely adjustable with respect to the vertical axis of said movable guide and a reflector carried by said turret.

25. In a projection apparatus the combination of a vertical standard, a supporting block positioned on the upper end of said standard, said block being adjustable relative to the vertical axis of said standard, guides positioned in said block, one of said guides being fixed the other movable, an illuminating fixture connected to the lower end of the fixed guide, a turret positioned on the upper end of said movable guide, said turret being adjustable arcuately and parallel to the vertical axis of said movable guide and a reflector carried by said turret.

26. In a projection apparatus the combination of a vertical standard, a supporting block positioned on the upper end of said standard, said block being adjustable arcuately, transversely and parallel to the vertical axis of said standard, guides positioned in said block, one of said guides being fixed the other movable, an illuminating fixture connected to the lower end of the fixed guide, a turret swivelled on the upper end of said movable guide, remote contol means connected with said turret to swivel the latter, longitudinally adjustable guides carried by said turret and a reflector supported by said guide.

ROGER M. HILL.